ized and which may have added to it, if necessary, a photo-polymerization initiator...

United States Patent Office
3,219,446
Patented Nov. 23, 1965

3,219,446
METHOD OF MAKING TRANSFER PRINTS
Elliot Berman, East Braintree, Mass., assignor to The National Cash Register Company, Dayton, Ohio, a corporation of Maryland
No Drawing. Filed July 3, 1963, Ser. No. 292,720
2 Claims. (Cl. 96—28)

This application is a continuation-in-part of Serial No. 827,445, filed July 16, 1959, and now abandoned.

This invention relates to an image-transfer record material sheet supplied with a profusion of normally liquid sub-visible droplets of marking material, which droplets may be transferred to a receiving copy sheet by pressure, except in areas where the droplets are rendered non-liquid by being selectively subjected to light, as through a light image control means including stencils, transparencies, and projecting devices.

In some instances, light alone may make the droplets non-liquid, and in other instances, depending on the materials used in the droplets, the application of light must be followed by a heating step.

Preferably, the entities are of a size that cannot be individually resolved by the unaided eye when transferred, the diameter of any such transferred liquid entity preferably being under 25 microns in largest dimension.

In the preferred embodiment of the invention, the entities of marking material are of a liquid which contains, as a component thereof, a cross-linkable polymer which in cross-linked state, which state may be brought about by subjecting it to certain electro-magnetic radiation, causes the liquid, of which it forms a part, to assume a non-liquid rigid condition, and this marking liquid is contained in dispersed form as microscopic droplets held in a film on a sheet of record material, such as paper, or held in microscopic capsules coated on such a record material sheet, the film and the capsule walls being of a nature to transmit any cross-linking electro-magnetic radiation applied thereto. The liquid-droplet-containing film may be made and coated on a sheet of record material as disclosed in United States Patent No. 2,374,862, which issued May 1, 1945, on the application of Barrett K. Green, and the fluid-droplet-containing microscopic capsules may be made as disclosed in United States Patent No. 2,800,457, which issued on July 23, 1957, on the application of Barrett K. Green and Lowell Schleicher.

Example 1

In the preferred embodiment, the liquid marking material consists of, in parts by weight,

| | |
|---|---|
| Furfural-acetone resin | 35 |
| Azo-blue-"B" black | 5 |
| Iodoform | 10 |
| Toluene | 25 |
| Chlorinated diphenyl (of 42% chlorine content) | 25 |

The furfural-acetone resin may be made according to the disclosure in United States Patent No. 1,587,269, which issued June 1, 1926, on the application of Murray C. Beebe et al., by condensing furfural and acetone in the presence of an aqueous solution of sodium hydroxide.

According to the method disclosed in United States Patent No. 2,374,862, mentioned as disclosing a method of making a liquid-droplet-containing coating on a sheet, 4 parts, by weight, of the making liquid is emulsified in one part, by weight, of a solution of 20 parts of gelatin, 79 parts of water, and one part of saponin, all by weight, and the resultant emulsion is coated thinly no a sheet of paper and dried, leaving the marking liquid as a profusion of discrete microscopic liquid droplets in a solid gelatin film which may be pressure-ruptured to release the droplets as long as they remain liquid. If the film is subjected to ultra-violet light, through an image control means, those droplets receiving such light will become solidified sufficiently as not to flow under printing pressure, due to the cross-linking of the furfural-acetone resin and will not transfer to a copy-receiving sheet by use of pressure, leaving the image on the copy sheet. Essentially, this record material will transfer a positive image of the light control means. The light control means can be a stencil, a film with dark areas which block ultra-violet light, and light areas transmitting ultra-violet light, in the pattern of the image to be transferred, or an image may be projected on the sensitive droplets, as by a projector. As substitutes for the cross-linking furfural-acetone-toluene solution may be mentioned polyvinyl-cinnamate dissolved in dibutyl-phthalate as disclosed in United States Patent No. 2,670,286, which issued February 23, 1954, on the application of Louis M. Minsk et al. Another material that may be used as a component of a liquid droplet which may be rendered non-liquid, to a non-transferable condition, by cross-linking said component thereof with ultra-violet light, is vinyl benzal acetophenone polymer dissolved in the before-mentioned chlorinated diphenyl, but of 21 percent chlorine content, in the proportion of 1 to 4 parts, by weight, the method of preparing the polymer being disclosed in United States Patent No. 2,708,665, which issued May 17, 1955, on the application of Cornelius C. Unruh. It will be understood that these cross-linkable compounds, used in liquid solutions, are only exemplary, other soluble compounds, for instance, being disclosed in United States Patents Nos. 2,835,656; 2,831,768; 2,-824,087; 2,824,048; 2,816,091; 2,811,510; 2,811,509; 2,-801,233; 2,787,546; 2,754,210; 2,751,373; 2,751,296; 2,-732,301; 2,728,745; 2,725,372; 2,719,141; 2,716,103; 2,-716,102; 2,716,097; 2,706,725; 2,697,039; 2,690,966; 2,670,287; 2,670,285; 2,666,701; 2,610,120; 2,566,302; 2,544,905; 2,475,980; and 2,169,003.

Example 2

In a second example of the invention, liquid monomer compositions or solutions may be used for the droplets, and their hardening to a polymerized non-liquid and, hence, non-transferable condition is brought about by subjecting such to ultra-violet or visible electro-magnetic radiation, with photo-polymerization initiators added, if necessary, to start the polymerization process. As a specific embodiment, droplets of the following composition may be used, in parts by weight:

| | |
|---|---|
| Lauryl methacrylate monomer | 100.0 |
| α-Chloromethyl naphthalene | 1.5 |
| Lauroyl peroxide | 0.5 |
| Azo-blue-"B" black | 5.0 |

In all instances where the liquid material is colorless, or insufficiently colored to make a transfer mark visible, a coloring material, preferably an oil-soluble dye, is added, the color and amount of which is a matter of choice.

Other materials which in their natural liquid monomer state, or in solution, can be hardened to a non-transferable condition when contained as droplets on or in a record sheet, upon being subjected to electro-magnetic radiation, are disclosed in United States Patents Nos. 2,505,-067; 2,579,095; 2,641,576; 2,448,828; 2,505,068; 2,722,-512; 2,850,445; and 2,875,047. In inducing and carrying out the polymerization of these materials, heat, in addition to polymerizing electro-magnetic radiation, may be resorted to shorten the time required for the polymerization to take place.

Example 3

In a third example, which involves liquid droplets which are hardened by polymerization, the liquid composition may contain a monomer which normally is polymerizable by heat, which monomer composition is accompanied by an inhibitor material which prevents such hardening polymerization by heat unless such inhibitor previously is rendered ineffective by exposure to light predominating in wave lengths including the ultra-violet through orange regions of the light spectrum. As a specific liquid composition, useful and representative of this example of the invention, mix, in parts by weight:

| | |
|---|---|
| α-methyl styrene monomer | 100.00 |
| N,N'-disubstituted p-quinone diimine-N,N'-dioxide (the inhibitor) | 0.01 |
| Azo-blue-"B" black | 3.00 |

In use, the sheet containing liquid droplets of the composition of this third example is first selectively irradiated, by use of a selected image control means, with the specified electro-magnetic radiation to destroy the polymerization inhibitor in those areas in which the droplets are to be hardened, and heating the record material before applying it by pressure to the copy-receiving sheet. The destruction of N,N'-disubstituted p-quinone diimine-N,N'-dioxide, by actinic light, is disclosed in United States Patent No. 2,831,805.

The following examples, as well as the method disclosed in United States Patent No. 2,800,457, are representative of methods suitable for encapsulating the photopolymerizable materials within the scope of the invention.

*Example 4*

An internal phase of an intended emulsion, having the following composition, is prepared by making a solution of the following, in parts by weight:

55 parts of furfural-acetone resin as prepared in United States Patent No. 1,587,269
20 parts of iodoform
43 parts of toluene
34 parts of Arochlor
8 parts of azo oil blue-black B An emulsion is made consisting of 160 parts of the above internal phase dispersed in 180 parts of an 11 percent gelatin solution, at 50 degrees centigrade; 180 grams of an 11 percent gum arabic solution (at room temperature) is then added, and the pH is adjusted to 4.8. The so-formed emulsion is transferred into a two-liter flask and the contents diluted to 1450 mls. with distilled water at 50 degrees centigrade. The flask containing the emulsion is then placed in a water bath fitted with a stirrer and electrodes for determining pH, two drops of octyl alcohol is added to the emulsion to eliminate foaming, and the pH is adjusted with 10 percent acetic acid to bring about coacervation. The acetic acid is added rapidly until a pH of about 5.3 is reached; at this point, the further addition of acid is checked by microscopic examination of the sample until the desired coacervate droplet size is formed. Normally, the best pH for coacervation, resulting in the formation of encapsulated droplets, is found in the pH range of 4.6 to 4.9, depending largely on the degree of aggregation of oil droplet capsules which is desired, and the source and previous history of the gelatin.

The beaker containing the coacervate is then transferred to an ice bath and the contents chilled to 10 degrees centigrade with constant stirring. When cooled to this temperature, 3.8 mls. of 38 percent formaldehyde solution is added to the coacervate, within a few minutes followed with 15 mls. of 15 percent PVM–MA solution of [poly(methyl vinyl ether-maleic anhydride)] of pH 9, and the pH of the coacervate is then raised to 10 by the gradual addition of 20 percent NaOH solution. The coacervate is continuously stirred for at least one hour in the ice bath, which is maintained at or below 10 degrees centigrade, then removed from the ice bath and allowed to cool to room temperature with continuous stirring for a period of 12 to 20 hours. The coacervate is allowed to settle and then concentrated to 25 percent solids by decantation of the supernatant liquid. The resulting concentrate has the proper consistency and concentration to be coated directly on paper if desired, without the addition of binders or other modifiers. Generally, a coating of 10 pounds per ream, sheets 24 by 36 inches, is sufficient to provide a suitable photosensitive transfer sheet. A transfer sheet including a coating containing the light-polymerizable material prepared as above described will, when exposed through light control means to a source of ultra-violet and visible light, such as a carbon arc source found in a Fadometer tester, provide an image in terms of polymerized and still-liquid capsule contents. By pressing the light-exposed sensitive coating against a receiving sheet, the unexposed capsules containing unpolymerized liquid material will release and transfer said liquid onto the receiving sheet in terms of a positive of the light control means. Generally, a hard polymerized mass is produced within exposed capsules by exposing the photosensitive sheet from one to ten minutes, preferably one to four minutes, at a distance of twelve inches.

*Example 5*

The coacervation procedure was the same as in Example 4, except that the photo-polymerizable material contained a polyvinyl cinnamate of the type shown in United States Patent No. 2,670,286, instead of a furfuralacetone resin. The internal phase of this example consists of, in parts by weight:

10 parts of polyvinyl cinnamate
20 parts of dibutyl phthalate
10 parts of 1,2-benzanthraquinone

*Example 6*

The method of encapsulation is the same as that in Example 4, except that the internal phase consists of the following, in parts by weight:

25 parts of polyvinyl benzal acetophenone, as disclosed in United States Patent No. 2,708,665
100 parts of chlorinated diphenyl, 21% chlorine

*Example 7*

The method of Example 4 is repeated with the following internal phase, in parts by weight:

100 parts lauryl methacrylate monomer
1.5 parts α-chloromethyl naphthalene
0.5 part lauroyl peroxide
5.0 parts azo-blue-B black

*Example 8*

In this example, a heat-polymerizable composition which contains a polymerization inhibitor which is inactivated by exposure to ultra-violet and visible light is encapsulated. The internal phase to be encapsulated in the manner shown in Example 4 consists of, in parts by weight:

100 parts α-methyl styrene
.01 part N,N'-disubstituted p-quinone diimine-N,N'-dioxide
3 parts azo-blue-B black The encapsulated material is coated on sheet material and used in the manner disclosed in Example 3.

The invention resides in record material provided with discrete liquid droplets containing known polymerizable materials in dispersion or solution, which droplets are modified by use of a selected ultra-violet light image applied to the record material to accordingly control the transfer of the image from the light-modified record material to a receiving copy sheet by use of pressure which releases still-liquid droplets to make, by transfer, a reproduction of the dark areas of the image on the said receiving copy sheet.

What is claimed is:
1. A copying process for making visible positive prints comprising:
   (a) exposing a record transfer sheet to light through a light-image control device, said sheet including a rupturable light-sensitive coating disposed on a base, the coating including a profusion of microscopic capsules containing liquid of a distinctive color containing a high proportion of light-polymerizable material that forms a hard, infusible, non-soluble resin when exposed to light, whereby said exposure provides an image in terms of still-liquid and solid capsule contents on said sheet;
   (b) placing said transfer sheet with the image-bearing side in contact with a receiving copy sheet; and
   (c) applying sufficient pressure to said sheets, while in contact, to rupture the coating and included capsules and transfer the still-liquid capsule contents onto the copy sheet as a visible positive print.

2. A copying process for making visible positive prints comprising:
   (a) exposing a record transfer sheet to light through a light-image control device, said sheet including a rupturable light-and-heat-sensitive coating disposed on a base, the coating including a profusion of microscopic capsules containing liquid of a distinctive color containing a high proportion of polymerizable material that forms a hard, infusible, non-soluble resin when exposed to light, followed by heat;
   (b) heating said light-exposed sheet to polymerizing temperature, whereby said exposure to light and heat provides an image in terms of still-liquid and solid capsule contents on said sheet;
   (c) placing said transfer sheet with the image-bearing side in contact with a receiving copy sheet; and
   (d) applying sufficient pressure to said sheets, while in contact, to rupture the coating and included capsules and transfer the still-liquid capsule contents onto the copy sheet as a visible positive print.

References Cited by the Examiner

FOREIGN PATENTS 1,272,059   8/1961   France.

NORMAN G. TORCHIN, *Primary Examiner.*